United States Patent
Li et al.

(10) Patent No.: US 10,572,711 B2
(45) Date of Patent: Feb. 25, 2020

(54) FINGERPRINT IDENTIFICATION MODULE AND MANUFACTURING METHOD THEREOF, DISPLAY DEVICE

(71) Applicant: BOE TECHNOLOGY GROUP CO., LTD., Beijing (CN)

(72) Inventors: Changfeng Li, Beijing (CN); Xue Dong, Beijing (CN); Jing Lv, Beijing (CN); Haisheng Wang, Beijing (CN); Yingming Liu, Beijing (CN); Xiaoliang Ding, Beijing (CN); Pengpeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 245 days.

(21) Appl. No.: 15/736,404

(22) PCT Filed: Jun. 16, 2017

(86) PCT No.: PCT/CN2017/088554
§ 371 (c)(1),
(2) Date: Dec. 14, 2017

(87) PCT Pub. No.: WO2018/028303
PCT Pub. Date: Feb. 15, 2018

(65) Prior Publication Data
US 2019/0065809 A1 Feb. 28, 2019

(30) Foreign Application Priority Data
Aug. 8, 2016 (CN) .......................... 2016 1 0641186

(51) Int. Cl.
*G06K 9/00* (2006.01)
*G06F 3/042* (2006.01)

(52) U.S. Cl.
CPC ......... *G06K 9/0004* (2013.01); *G06F 3/0421* (2013.01); *G06F 2203/04109* (2013.01)

(58) Field of Classification Search
CPC ................ G06K 9/0004; G06F 3/0421; G06F 2203/04109; G06F 3/0412
See application file for complete search history.

(56) References Cited

U.S. PATENT DOCUMENTS

2001/0035848 A1* 11/2001 Johnson ............... G09G 3/3216
345/76
2003/0183019 A1* 10/2003 Chae .................... G06K 9/0004
73/862.624

(Continued)

FOREIGN PATENT DOCUMENTS

CN 104882457 A 9/2015
CN 105095872 A 11/2015

(Continued)

OTHER PUBLICATIONS

Search Report for International Application No. PCT/CN2017/088554 dated Sep. 18, 2017.

*Primary Examiner* — Siamak Harandi
(74) *Attorney, Agent, or Firm* — Calfee, Halter & Griswold LLP

(57) ABSTRACT

A fingerprint identification module and a display device are disclosed. In the fingerprint identification module, a light shading layer above a photosensitive sensing unit includes a first light shading component above a photosensitive diode of the photosensitive sensing unit, and a fixed potential signal line. The first light shading component is electrically connected to a terminal of the photosensitive diode thereunder and connected to the fixed potential signal line. Since the fixed potential signal line is above the photosensitive diode, and the light shading layer is directly used to form the fixed potential signal line, connecting holes that need to (Continued)

occupy some space can be omitted, and the area occupied by the photosensitive diode can be maximized, thus the light current generated by the photosensitive diode during fingerprint detection can be increased so as to enhance fingerprint detection accuracy.

20 Claims, 4 Drawing Sheets

(56) References Cited

U.S. PATENT DOCUMENTS

| | | | |
|---|---|---|---|
| 2006/0011913 A1* | 1/2006 | Yamazaki | G06F 3/0412 257/59 |
| 2015/0249106 A1 | 9/2015 | Jiroku | |
| 2017/0161541 A1 | 6/2017 | Li et al. | |
| 2017/0255810 A1 | 9/2017 | Liu et al. | |

FOREIGN PATENT DOCUMENTS

| | | |
|---|---|---|
| CN | 204759454 U | 11/2015 |
| CN | 105373772 A | 3/2016 |
| CN | 106096595 A | 11/2016 |
| CN | 206058227 U | 3/2017 |
| KR | 20050072956 A | 7/2005 |

* cited by examiner

FINGERPRINT IDENTIFICATION MODULE AND MANUFACTURING METHOD THEREOF, DISPLAY DEVICE

CROSS REFERENCE TO RELATED APPLICATION

The present application is the U.S. national phase entry of PCT/CN2017/088554, with an international filing date of Jun. 16, 2017, which claims priority to the patent application No. 201610641186.8 filed with the Patent Office of the People's Republic of China on Aug. 8, 2016, the entirety of which is incorporated herein by reference.

TECHNICAL FIELD

The present disclosure relates to the field of touch technology, in particular to a fingerprint identification module, a manufacturing method thereof and a display device.

BACKGROUND

With the rapid development of display technologies, display panels having fingerprint identification functions have gradually become widespread in people's lives. At present, the fingerprint identification function is realized in display devices by means of, for example, the photosensitivity of PIN junction. A photosensitive sensing unit including PIN junctions can receive light reflected by a fingerprint so as to generate light current, and because of the difference in the intensities of light reflected by a valley and a ridge of the fingerprint, the generated light currents will be different, thus the valley and ridge of the fingerprint can be identified.

SUMMARY

Embodiments of the present disclosure provide a fingerprint identification module, a manufacturing method thereof and a display device, for improving the structure of the fingerprint identification module and improving detection performance of the fingerprint identification module in the display device.

The fingerprint identification module provided in the embodiment of the present disclosure comprises a substrate, a plurality of photosensitive sensing units in an array on the substrate, and a light shading layer above the photosensitive sensing units. The photosensitive sensing unit comprises a photosensitive diode for sensing changes in light intensity resulted from fingerprint pressing, and a control transistor for controlling the photosensitive diode to convert the changes in light intensity into electrical signals to be output. The light shading layer comprises a first light shading component and a fixed potential signal line above the photosensitive diode. The first light shading component is electrically connected to a terminal of the photosensitive diode, and the first light shading component is also connected to and at the same layer as the fixed potential signal line.

In an exemplary embodiment, with the fingerprint identification module provided in the embodiment of the present disclosure, an orthographic projection of the photosensitive diode on the substrate and an orthographic projection of the control transistor on the substrate do not overlap each other.

In an exemplary embodiment, the control transistor is a bottom gate thin film transistor, and the light shading layer further comprises a second light shading component above the control transistor.

In an exemplary embodiment, the first light shading component and the second light shading component that are above the same photosensitive sensing unit are electrically connected.

In an exemplary embodiment, the first light shading component and the second light shading component that are above the same photosensitive sensing unit are arranged at the same layer and form an integral structure.

In an exemplary embodiment, the control transistor is between the photosensitive diode and the substrate, and one of a drain and a source of the control transistor is connected to the other terminal of the photosensitive diode.

In an exemplary embodiment, the fingerprint identification module further comprises a touch detection unit between the photosensitive sensing unit and the substrate.

According to another aspect, an embodiment of the present disclosure further provides a display device comprising a display panel and the fingerprint identification module according to any one of the above embodiments, which is attached to a light exit surface of the display panel, the photosensitive sensing units in the fingerprint identification module being closer to the light exit surface of the display panel than the substrate.

In an exemplary embodiment, orthographic projections of patterns of the photosensitive sensing units and the light shading layer in the fingerprint identification module on the display panel are at gaps between sub-pixels in the display panel.

In an exemplary embodiment, the display device further comprises a touch detection unit, which is arranged between the substrate and the photosensitive sensing unit in the fingerprint identification module, or arranged in the display panel.

In an exemplary embodiment, the substrate in the fingerprint identification module is a protective cover plate.

In an exemplary embodiment, the display panel is an electroluminescent display panel, and the substrate in the fingerprint identification module is an encapsulating cover plate.

According to yet another aspect, an embodiment of the present disclosure further provides a method for manufacturing the fingerprint identification module, which comprises: forming a plurality of photosensitive sensing units in an array on a substrate, the photosensitive sensing unit comprising a photosensitive diode for sensing changes in light intensity resulted from fingerprint pressing and a control transistor for controlling the photosensitive diode to convert the changes in light intensity into electrical signals to be output; and forming a pattern of a light shading layer above the photosensitive sensing units, wherein the pattern of the light shading layer comprises a pattern of a first light shading component and a pattern of a fixed potential signal line above the photosensitive diode, and wherein the first light shading component is electrically connected to a terminal of the photosensitive diode, and the first light shading component is also connected to and at the same layer as the fixed potential signal line.

In an exemplary embodiment, in the manufacturing method as provided in the embodiment of the present disclosure, the step of forming a pattern of a light shading layer above the photosensitive sensing units further includes forming a pattern of a second light shading component above the control transistor.

DETAILED DESCRIPTION OF EMBODIMENTS

Figure 1:
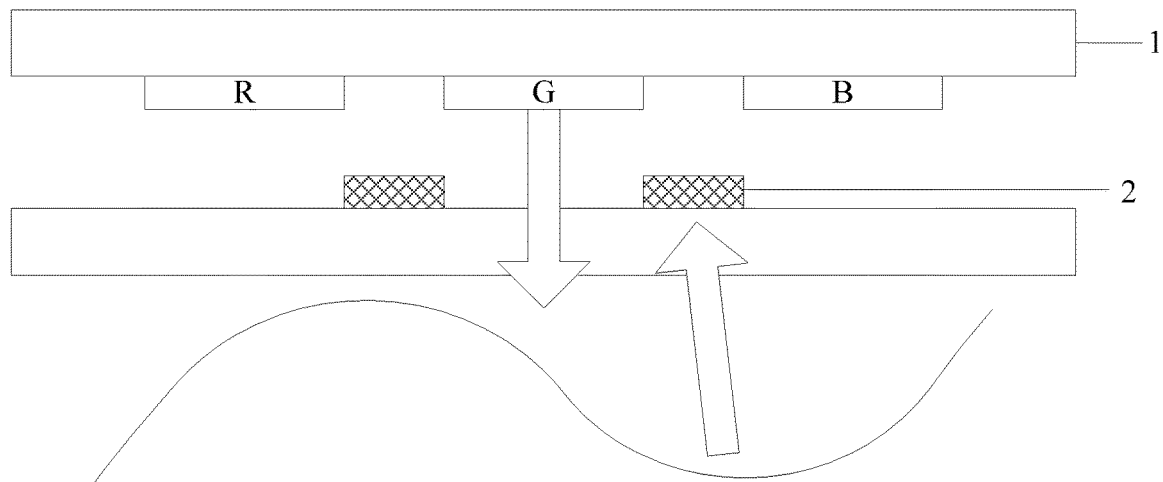
FIG. 1 is a schematic view for illustrating the principle of fingerprint identification function.

Embodiments of the fingerprint identification module, the manufacturing method thereof and the display device as provided in the present disclosure will be described in detail below with reference to the drawings.

The shapes and sizes of respective components in the drawings do not reflect the true proportions of the components, but they are only for illustrating the present disclosure.

FIG. 1 is a schematic drawing for illustrating the principle of the fingerprint identification function. As shown in FIG. 1, a photosensitive sensing unit 2 can receive light reflected by a fingerprint to generate light current, and because of the difference in the intensities of light reflected by a valley and a ridge, the generated light currents will be different, thus the valley and ridge of the fingerprint can be identified.

Figure 2:
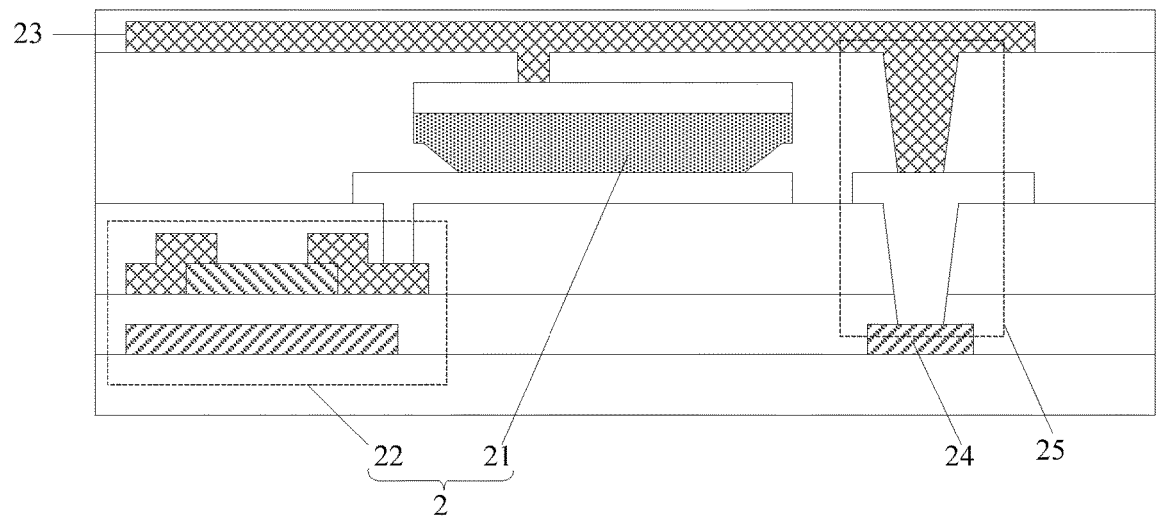
FIG. 2 is a structural diagram of a photosensitive sensing unit in a conventional fingerprint identification module.

FIG. 2 is a schematic drawing of a conventional fingerprint identification module. As shown in FIG. 2, the photosensitive sensing unit 2 in the fingerprint identification module comprises a photosensitive diode 21 for sensing changes in light intensity resulted from fingerprint pressing, and a control transistor 22 for controlling the photosensitive diode 21 to convert the changes in light intensity into electrical signals. A drain of the control transistor 22 is connected to a terminal of the photosensitive diode 21, a source thereof is connected to a read signal line, and a gate thereof is connected to a scan signal line. When loading scan signals through the scan signal line, the control transistor 22 is in an ON state, so that the read signal line is electrically connected to the photosensitive diode 21 to load a reverse bias voltage onto the photosensitive diode 21 or to export electrical signals from the photosensitive diode 21. In order to keep the photosensitive diode 21 at a reverse bias state, a fixed potential needs to be provided to the other terminal of the photosensitive diode 21. Therefore, as shown in FIG. 2, the other terminal of the photosensitive diode 21 is connected through a light shading component 23 to a fixed potential signal line 24 that is arranged at the same layer as the gate of the control transistor 22. Moreover, in order to connect the light shading component 23 at the upper layer to the fixed potential signal line 24 at the lower layer, a connecting hole 25 penetrating the layers therebetween is required. It can be seen from FIG. 2 that the connecting hole 25 will occupy a large space, thus influencing the area of the photosensitive diode 21. In addition, due to the restriction of the position of the photosensitive sensing unit 2, light-emitting pixels R(red), B(blue) and G(green) in the display panel have distances of about 20-26 μm therebetween, so the area of the photosensitive diode 21 will be small because the connecting hole 25 occupies a relatively large space, as a result, the light current generated by the photosensitive diode 21 during fingerprint detection will be small, which will influence the fingerprint detection accuracy.

Figure 3:
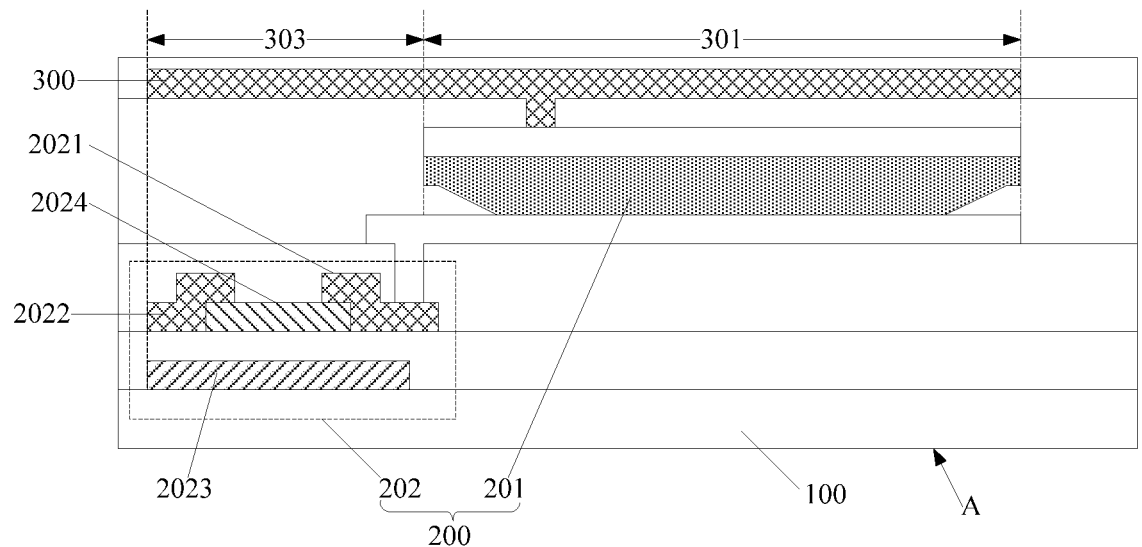
FIG. 3 is a structural diagram of a fingerprint identification module provided in an embodiment of the present disclosure.

A fingerprint identification module provided by an embodiment of the present disclosure, as shown in FIG. 3, comprises a substrate 100, a plurality of photosensitive sensing units 200 in an array on the substrate 100, and a light shading layer 300 above the photosensitive sensing units 200. A surface of the substrate 100 facing away from the photosensitive sensing units 200 is a fingerprint contact surface A, i.e. a surface to be pressed by a finger.

The photosensitive sensing unit 200 comprises a photosensitive diode 201 for sensing changes in light intensity resulted from fingerprint pressing, and a control transistor 202 for controlling the photosensitive diode 200 to convert the changes in light intensity into electrical signals to be output.

Figure 4:
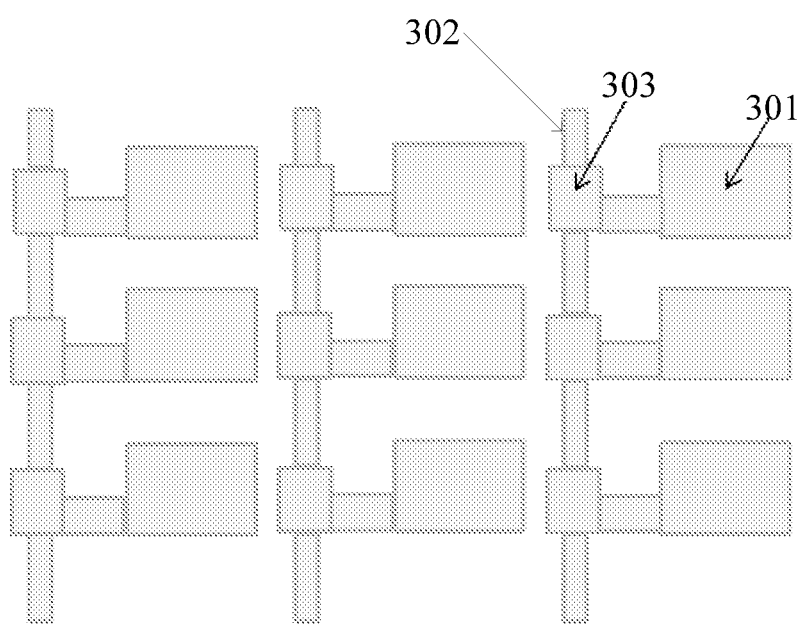
FIG. 4 is a plan view of a light shading layer in a fingerprint identification module provided in an embodiment of the present disclosure.

As shown in FIG. 4, the light shading layer 300 comprises a first light shading component 301 above the photosensitive diode 201 and a fixed potential signal line 302. The first light shading component 301 is electrically connected to a terminal of the photosensitive diode 201 thereunder, and the first light shading component 301 is also connected to the fixed potential signal line 302, and the first light shading component 301 and the fixed potential signal line 302 are arranged at the same layer.

Regarding the fingerprint identification module provided in the embodiment of the present disclosure, the fixed potential signal line 302 is arranged above the photosensitive diode 201 and the light shading layer 300 is directly used to form the fixed potential signal line 302, so connecting holes that need to occupy some space can be avoided, and the area occupied by the photosensitive diode 201 can be maximized, which is advantageous to increase the light current generated by the photosensitive diode 201 during fingerprint detection so as to enhance fingerprint detection accuracy.

It shall be noted that, in the fingerprint identification module provided in the embodiments of the present disclosure, each of the first light shading components 301 can be connected to the fixed potential signal line 302 in various manners, and FIG. 4 only schematically shows each column of the first light shading components 301 is connected to one fixed potential signal line 302, while in other embodiments, there can be other types of connection, which are not elaborated herein.

In the embodiment of the present disclosure, as shown in FIG. 3, the control transistor 202 is arranged between the photosensitive diode 201 and the substrate 100, a drain 2021 of the control transistor 202 is connected to a terminal of the photosensitive diode 201, a source 2022 of the control transistor 202 is connected to the read signal line (not shown in FIG. 3), thus when loading scan signals onto a gate 2023 of the control transistor 202, the control transistor 202 is in an ON state, so that the read signal line is electrically connected to a terminal of the photosensitive diode 201 to load a reverse bias voltage onto the photosensitive diode 201 or to export electrical signals from the photosensitive diode 201.

In an embodiment, as shown in FIG. 3, in the photosensitive sensing unit 200 of the fingerprint identification module as provided in the embodiment of the present disclosure, an orthographic projection of the photosensitive diode 201 on the substrate 100 and an orthographic projection of the control transistor 202 on the substrate 100 do not overlap each other. Therefore, light irradiated onto the photosensitive diode 201 will not be reflected to an active layer of the control transistor 202, so as to avoid or reduce influence to the switching performance of the control transistor 202.

In practical implementation, the control transistor 202 in the fingerprint identification module provided in the embodiment of the present disclosure may be a top gate thin film transistor, i.e. the gate of the thin film transistor is above the active layer. Alternatively, a bottom gate thin film transistor may be used, as shown in FIG. 3, that is, an active layer 2024 of the thin film transistor is arranged above the gate 2023.

In case the top gate thin film transistor is used, in order to ensure that external light will not irradiate onto the active layer of the control transistor 202 to influence the switching performance of the control transistor 202, a light shading component capable of blocking the active layer can be arranged at the bottom of the top gate thin film transistor.

In case the bottom gate thin film transistor is employed, in order to ensure that light for display as emitted from the display panel will not irradiate onto the active layer 2024 of the control transistor 202 to influence the switching performance of the control transistor 202, a light shading component capable of blocking the active layer can be arranged above the bottom gate thin film transistor. Therefore, as shown in FIGS. 3 and 4, the pattern of the light shading layer 300 may further include a second light shading component 303 above the control transistor 202, which at least covers the active layer 2024 of the control transistor 202 so that light for display as emitted from the display panel will not influence the switching performance of the control transistor 202.

Further, in the fingerprint identification module provided in the embodiment of the present disclosure, as shown in FIG. 3, the first light shading component 301 and the second light shading component 303 that are above the same photosensitive sensing unit 200 can be connected to form an integral structure, so that complex electrical signal interferences by the display panel can be shielded or reduced to provide a stable electrical environment for fingerprint detection, thereby increasing fingerprint detection accuracy.

Figure 5:
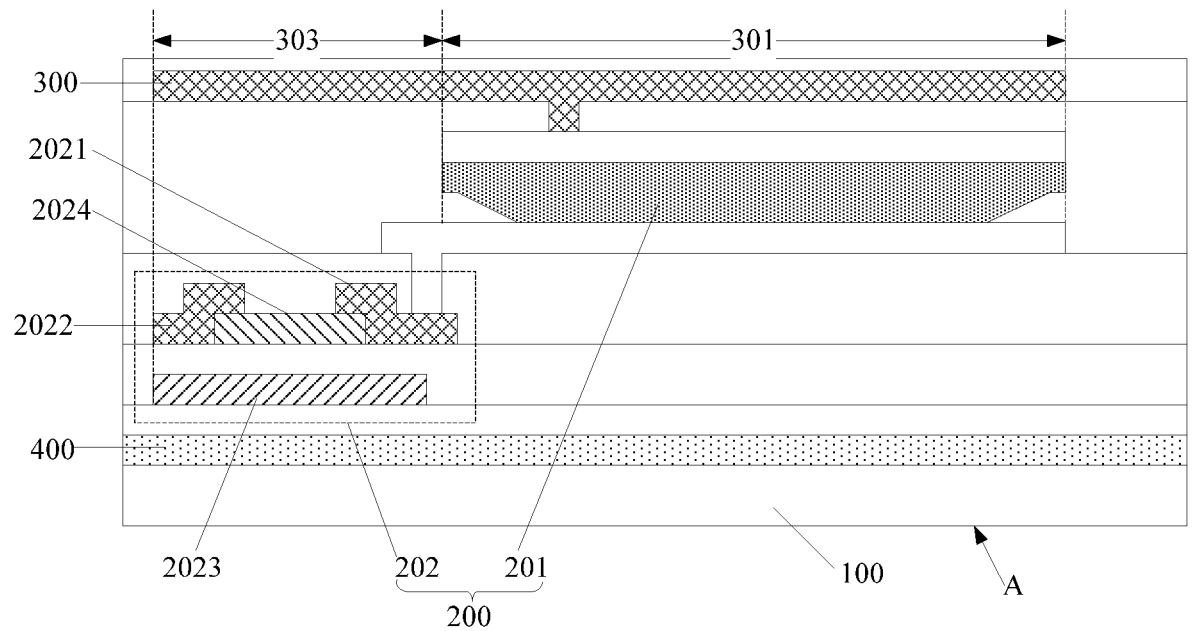
FIG. 5 is a structural diagram of a fingerprint identification module provided in another embodiment of the present disclosure.
Figure 6:
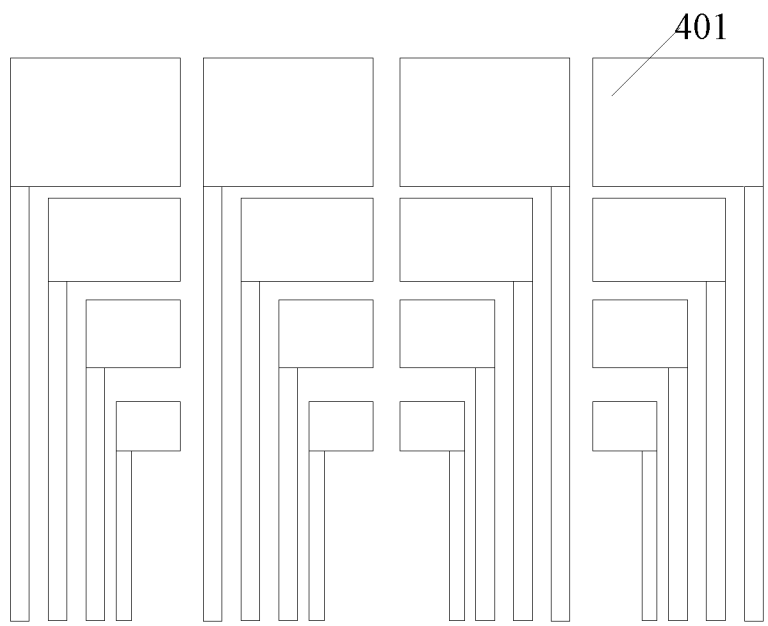
FIG. 6 is a structural diagram of a touch detection unit in a fingerprint identification module provided in an embodiment of the present disclosure.

Further, in order to enable the fingerprint identification module to have a touch detection function, a fingerprint identification module provided in another embodiment of the present disclosure, as shown in FIG. 5, may further comprise a plurality of touch detection units 400 between the photosensitive sensing units 200 and the substrate 100. The touch detection units 400 are arranged closer to a user than the photosensitive sensing unit 200, i.e. closer to the fingerprint contact surface A of the substrate 100. The touch detection unit 400 can be implemented in different manners. For example, in an embodiment, the touch detection unit 400 can be a single-layer structure having a pattern of a touch detection electrode 401 as shown in FIG. 6. In other embodiments, the touch detection unit 400 may include two layers of touch detection electrodes. The specific implementation of the touch detection unit 400 is not limited in the present invention.

Based on the same inventive concept, an embodiment of the present disclosure further provides a method for manufacturing the fingerprint identification module, which may comprise the following steps: forming a plurality of photosensitive sensing units in an array on a substrate, the photosensitive sensing unit comprising a photosensitive diode for sensing changes in light intensity resulted from fingerprint pressing, and a control transistor for controlling the photosensitive diode to convert the changes in light intensity into electrical signals to be output; and forming a pattern of a light shading layer above the photosensitive sensing units, the pattern of the light shading layer comprising a first light shading component and a fixed potential signal line above the photosensitive diode, the first light shading component is electrically connected to a terminal of the photosensitive diode, and the first light shading component is also connected to and at the same layer as the fixed potential signal line.

In another embodiment, the method further comprises forming a second light shading component above the control transistor which is at the same layer as the first light shading component and the fixed potential signal line.

Figure 7A:
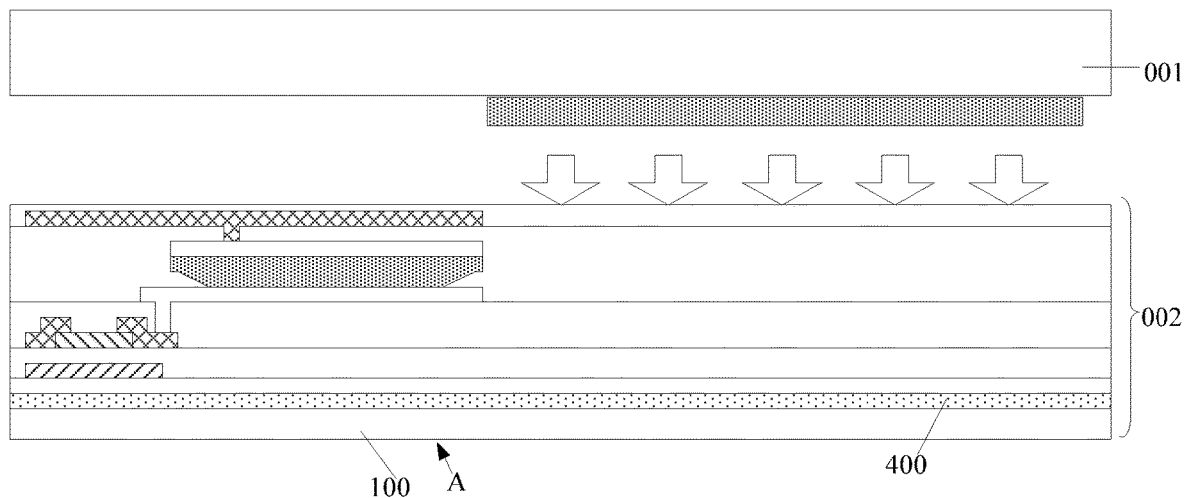
FIG. 7a and FIG. 7b are structural diagrams of display devices comprising the fingerprint identification module provided in different embodiments of the present disclosure.
Figure 7B:
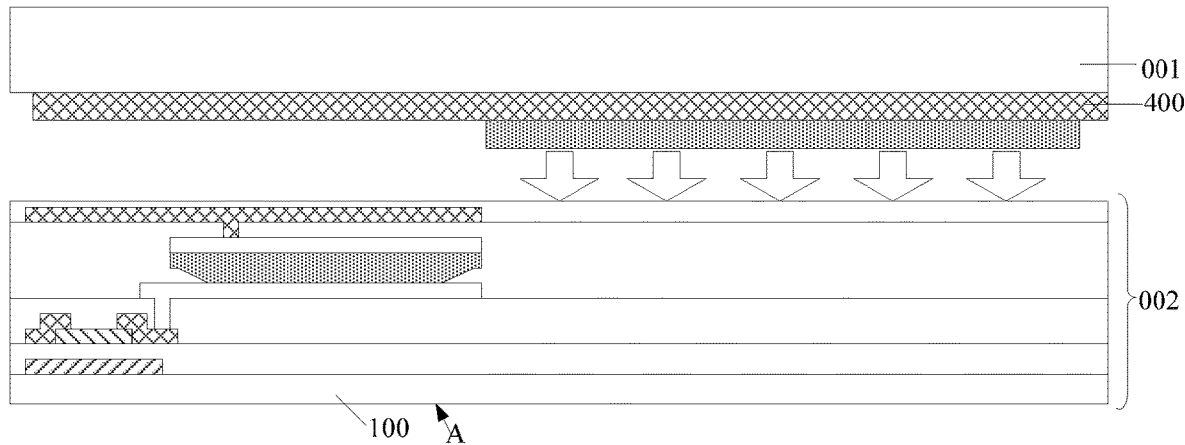

Based on the same inventive concept, further embodiments of the present disclosure provides a display device, which, as shown in FIGS. 7a and 7b, comprises a display panel 001 and a fingerprint identification module 002 provided in the above embodiments of the present disclosure and arranged on a light exit surface of the display panel 001. Photosensitive sensing units in the fingerprint identification module 002 are arranged on a surface of the substrate 100 facing the display panel 001, i.e. the fingerprint contact surface A faces away from the display panel 001.

The display device provided in the embodiment of the present disclosure can be any product or component having a display function, such as a mobile phone, a tablet PC, a TV, a monitor, a laptop, a digital photo frame, a navigator, etc.

As for the details of the fingerprint identification module 002 in the display device provided in the embodiment of the present disclosure, reference can be made to the forgoing descriptions. In addition, it shall be noted that, the plurality of touch detection units 400 included in the display device can be arranged between the substrate 100 and the photosensitive sensing unit 200 of the fingerprint identification module 002, as shown in FIG. 7a; alternatively, the touch detection units 400 is arranged in the display panel 001, as shown in FIG. 7b, i.e. the touch detection units 400 are fabricated as a component in the display panel 001. Moreover, as mentioned before, the specific structures of the touch detection units 400 are not limited and can be implemented in various ways.

Further, as shown in FIGS. 7a and 7b, in order not to influence an aperture ratio of the display panel 001, in the display device provided in the embodiment of the present disclosure, patterns of the photosensitive sensing units 200 and the light shading layer 300 in the fingerprint identification module 002 can be arranged in such a way as that orthographic projections of the patterns on the display panel 001 are at gaps between sub-pixels in the display panel 002, namely, positions of the patterns of the photosensitive sensing units 200 and the light shading layer 300 correspond to a non-light-emitting area of the display panel.

In practical implementation, the display panel 001 in the display device as provided in the embodiment of the present disclosure can be a liquid crystal display panel, or an electroluminescent display panel, or other flat panel display panels, which is not limited herein.

In practical implementation, the substrate 100 in the fingerprint identification module 002 in the display device as provided in the embodiment of the present disclosure can be a protective cover plate, i.e. the fingerprint identification module 002 is formed on an inner surface of the protective cover plate facing the display panel 001. Alternatively, the protective cover plate may be provided separately, i.e. the fingerprint identification module 002 is provided between the display panel 001 and the protective cover plate, which is not limited herein.

In addition, in case the display panel 001 in the display device provided in the embodiment of the present disclosure is an electroluminescent display panel, the substrate 100 in the fingerprint identification module 002 can also act as an encapsulating cover plate, namely, the fingerprint identification module 002 is made on an inner surface of the encapsulating cover plate facing the display panel 001.

Embodiments of the present disclosure provide the fingerprint identification module, the manufacturing method thereof and the display device. The light shading layer above the photosensitive sensing unit in the fingerprint identification module comprises the first light shading component above the photosensitive diode of the photosensitive sensing unit and the fixed potential signal line. The first light shading component is electrically connected to a terminal of the photosensitive diode thereunder, and the first light shading component is also connected to the fixed potential signal line. Connecting holes that need to occupy some space can be omitted in the fingerprint identification module provided in the embodiments of the present disclosure, and the area occupied by the photosensitive diode can be maximized, which is advantageous to increase the light current generated by the photosensitive diode during fingerprint detection so as to increase fingerprint detection accuracy.

Those skilled in the art can make various changes and modifications to the present disclosure without departing from the spirit and scope of the invention. Thus if the changes and modifications to the present disclosure fall into the scope of the appended claims or the equivalents thereof, the present invention intends to include such changes and modifications.

The invention claimed is:

1. A fingerprint identification module, comprising a substrate, a plurality of photosensitive sensing units in an array on the substrate, and a light shading layer above the photosensitive sensing units,
    wherein the photosensitive sensing unit comprises a photosensitive diode for sensing changes in light intensity resulted from fingerprint pressing, and a control transistor for controlling the photosensitive diode to convert the changes in light intensity into electrical signals to be output,
    wherein the light shading layer comprises a first light shading component and a fixed potential signal line above the photosensitive diode, wherein the first light shading component is electrically connected to a terminal of the photosensitive diode, and the first light shading component is also connected to and at the same layer as the fixed potential signal line.

2. The fingerprint identification module according to claim 1, wherein an orthographic projection of the photosensitive diode on the substrate and an orthographic projection of the control transistor on the substrate do not overlap each other.

3. The fingerprint identification module according to claim 2, wherein the control transistor is a bottom gate thin film transistor, and the light shading layer further comprises a second light shading component above the control transistor.

4. The fingerprint identification module according to claim 3, wherein the first light shading component and the second light shading component that are above the same photosensitive sensing unit are electrically connected.

5. The fingerprint identification module according to claim 4, wherein the first light shading component and the second light shading component that are above the same photosensitive sensing unit are arranged at the same layer and form an integral structure.

6. The fingerprint identification module according to claim 3, wherein the control transistor is between the photosensitive diode and the substrate, and one of a drain and a source of the control transistor is connected to the other terminal of the photosensitive diode.

7. The fingerprint identification module according to claim 1, wherein the fingerprint identification module further comprises a touch detection unit between the photosensitive sensing unit and the substrate.

8. A display device, comprising a display panel and the fingerprint identification module according to claim 1 which is attached to a light exit surface of the display panel, wherein the photosensitive sensing units in the fingerprint identification module is closer to the light exit surface of the display panel than the substrate.

9. The display device according to claim 8, wherein orthographic projections of patterns of the photosensitive sensing units and the light shading layer in the fingerprint identification module on the display panel are at gaps between sub-pixels in the display panel.

10. The display device according to claim 9, wherein the display panel is an electroluminescent display panel, and the substrate in the fingerprint identification module is an encapsulating cover plate.

11. The display device according to claim 8, wherein the display device further comprises a touch detection unit, which is arranged between the substrate and the photosensitive sensing unit in the fingerprint identification module, or arranged in the display panel.

12. The display device according to claim 8, wherein the substrate in the fingerprint identification module is a protective cover plate.

13. The display device according to claim 8, wherein the display panel is an electroluminescent display panel, and the substrate in the fingerprint identification module is an encapsulating cover plate.

14. The display device according to claim 8, wherein an orthographic projection of the photosensitive diode on the substrate and an orthographic projection of the control transistor on the substrate do not overlap each other.

15. The display device according to claim 14, wherein the control transistor is a bottom gate thin film transistor, and the light shading layer further comprises a second light shading component above the control transistor.

16. The display device according to claim 15, wherein the first light shading component and the second light shading component that are above the same photosensitive sensing unit are electrically connected.

17. The display device according to claim 16, wherein the first light shading component and the second light shading component that are above the same photosensitive sensing unit are arranged at the same layer and form an integral structure.

18. The display device according to claim 15, wherein the control transistor is between the photosensitive diode and the substrate, and one of a drain and a source of the control transistor is connected to the other terminal of the photosensitive diode.

19. A method for manufacturing a fingerprint identification module, comprising:
    forming a plurality of photosensitive sensing units in an array on a substrate, the photosensitive sensing unit comprising a photosensitive diode for sensing changes in light intensity resulted from fingerprint pressing and a control transistor for controlling the photosensitive diode to convert the changes in light intensity into electrical signals to be output; and forming a pattern of a light shading layer above the photosensitive sensing units, wherein the pattern of the light shading layer comprises a pattern of a first light shading component and a pattern of a fixed potential signal line above the photosensitive diode, and wherein the first light shading component is electrically connected to a terminal of the photosensitive diode, and the first light shading component is also connected to and at the same layer as the fixed potential signal line.

20. The manufacturing method according to claim 19, wherein the step of forming a pattern of a light shading layer above the photosensitive sensing units further includes forming a pattern of a second light shading component above the control transistor.

* * * * *